United States Patent [19]

Kinnear

[11] 4,437,253

[45] Mar. 20, 1984

[54] FISHERMAN'S HAND TOWEL AND METHOD

[76] Inventor: Duane W. Kinnear, R.D. 1,, East Springfield, Pa. 16411

[21] Appl. No.: 481,918

[22] Filed: Apr. 4, 1983

[51] Int. Cl.³ .............................................. A01K 97/04
[52] U.S. Cl. .............................................. 43/1; 43/4;
 43/4.5; 252/91; 428/905
[58] Field of Search ................. 206/812; 43/1, 4, 4.5; 252/91; 428/537, 905

[56] References Cited

U.S. PATENT DOCUMENTS 3,666,669 5/1972 Noordam, Jr. .................... 43/4.5 X
4,101,026 7/1978 Bonk .............................. 206/812 X

*Primary Examiner*—Henry F. Epstein
*Attorney, Agent, or Firm*—Ralph Hammar

[57] ABSTRACT

To prevent bait from acquiring human odors in the process of handling the bait during each baiting a fish line, the fisherman's hands are first wiped with an absorbent towel impregnated with an anise odor containing substance. This leaves a residual anise odor on the hands which is picked up by the bait in amounts sufficient to mask human odors. In a convenient form the anise odor containing substance may be added to whatever solution impregnates the damp or wet paper towels commercially available for hand cleaning purposes.

8 Claims, No Drawings

FISHERMAN'S HAND TOWEL AND METHOD

I have discovered that mere handling of the bait as part of the process of baiting a fish line causes the bait to acquire human odors which repel fish. Human odors are those naturally present on human hands and other odors picked up from soaps, detergents, automobiles, outboard motors and other devices with which fishermen come into contact. Human odors cannot be eliminated by washing because soaps and detergents have a fish repelling odor.

I have further discovered that this fish repelling action is overcome if the fisherman immediately before handling the bait or lures in the process of baiting the line, first wipes his hands with a damp absorbent towel impregnated with an anise odor containing substance. The towel absorbs some of the human odor substances and leaves a residual anise odor on the hands in amount sufficient to mask or neutralize or override any remaining human odor.

While wiping alone does remove some of the fish repelling substance, this alone is not enough. It is necessary that the towel leave an anise odor on the fisherman's hands which will in part be transferred to the bait or lure. Instead of acquiring a fish repelling human odor, the bait acquires an anise odor which masks the fish repelling human odor.

The anise odor is conveniently applied to any of the commercially available damp towels for hand cleaning purposes, e.g., Wet Ones, Wet Naps, etc. Typically, these towels consist of paper toweling impregnated with an aqueous liquid. The toweling absorbs about three times its weight of liquid. The liquid is predominately water but may also contain minor amounts of cleaning substances such as soaps, or detergents and hand lotion materials such as glycerine or lanolin.

A specific example of the liquid is, by weight:
1 part anise extract (25% anise oil, 75% alcohol)
20 parts water with or without small amounts of soap or detergents or glycerine or lanolin.

The kind of towel is not important. There is no technical reason why any anise impregnated towel would not be satisfactory. Paper towels are convenient and adapted to one time use. The impregnated towel makes the invention available to fishermen under all sorts of conditions and at any fishing site. The use of the towel becomes a part of each baiting operation.

The anise odor may be obtained from many sources. In addition to the anise oil used for flavoring, anise odor is present in anise bark oil, tarragon oil, licorice, anise camphor, etc. The amount of anise in each individual towel is very slight, about 3% of the weight of the towel in the specific example. Larger amounts of anise do no harm. Lesser amounts may be used, although fishermen may prefer to err on the side of too much anise rather than not enough, particularly since the amount of anise required will vary from person to person.

The discovery of the fish repelling action of human odors and of the masking was made in tests in which bait was first handled in the manner required for baiting a line and then offered to the fish.

While fish are very unpredictable and different species act differently, a majority of the time bait handled with normally clean hands, not freshly washed, would not be accepted by the fish. The fish would approach the bait close enough to smell it, and then move away.

I first thought that hand washing with soaps or detergents would remove the human odors and solve the problem. This was tried, and it was not a solution. A majority of the time, the fish were still repelled by the bait. I concluded that the fish were repelled by the odor of soap and detergents. The problem was not solved until I added an aqueous solution of anise extract to absorbent paper toweling such as commercially available under the trademark WET ONES. Hand wiping with this toweling before handling the bait eliminated the fish repelling action a majority of the time. It also made the invention usable at any fishing site. Apparently the residual human odor cannot be washed away, but can be masked by an odor attractive to fish.

While it is convenient to have the towels prewet and ready for use, any towels which dry out may be rewet with water without loss of effectiveness. This suggests that the towels might be manufactured dry and moistened prior to use.

The benefits are obtained with all forms of bait, live bait and artificial lures.

I claim:

1. A fisherman's towel for wiping hands at a fishing site immediately before handling bait in the process of each baiting of a line to prevent the bait from acquiring human odors from such handling, said towel consisting essentially of a piece of damp toweling impregnated with an amount of anise odor containing substance which leaves a residual anise odor on the fisherman's hands which is in part picked up by the bait in amount sufficient to mask any of said human odor acquired by the bait from said handling.

2. The towel of claim 1 in which the toweling is absorbent paper toweling.

3. The towel of claim 1 in which the impregnant contains a detergent in an amount insufficient to overpower said residual anise odor.

4. The towel of claim 1 in which the towel contains a hand conditioning material in amount insufficient to overcome the anise odor.

5. The method of fishing in which to prevent bait from acquiring fish repelling human odors in the process of each handling the bait while baiting a fish line at a fishing site the fisherman's hands are first wiped with the towel of claim 1 and the bait is then handled to bait the line so the bait in the course of said handling picks up an anise odor in amount sufficient to mask fish repelling human odors picked up by the bait from said hands.

6. The method of fishing in which to prevent bait from acquiring fish repelling human odors in the process of each handling the bait while baiting a fish line at a fishing site the fisherman's hands are first wiped with the towel of claim 2 and the bait is then handled to bait the line so the bait in the course of said handling picks up an anise odor in amounts sufficient to mask the fish repelling human odors picked up by the bait from said hands.

7. The method of fishing in which immediately before handling the bait in the process of each baiting of the fishline at the fishing site the fisherman's hands are first wiped with the towel of claim 4 and the bait is then handled to bait the line so the bait in the course of said handling picks up an anise odor in amount sufficient to mask fish repelling human odors picked up by the bait from said hands.

8. The method of fishing in which immediately before handling the bait in the process of each baiting of a fisherline at the fishing site the fisherman's hands are first wiped with a towel impregnated with an aqueous solution of anise oil and the bait is then handled to bait the line so the bait in the course of said handling picks up an anise odor in amounts sufficient to mask fish repelling human odors picked up by the bait from said hands.

* * * * *